US012724340B2

(12) United States Patent
Yuasa

(10) Patent No.: US 12,724,340 B2
(45) Date of Patent: Sep. 1, 2026

(54) WIDE-ANGLE CAMERA DEVICE AND SURVEY SYSTEM

(71) Applicant: TOPCON CORPORATION, Itabashi-ku (JP)

(72) Inventor: Taichi Yuasa, Itabashi-ku (JP)

(73) Assignee: TOPCON CORPORATION, Itabashi-ku (JP)

( * ) Notice: Subject to any disclaimer, the term of this patent is extended or adjusted under 35 U.S.C. 154(b) by 0 days.

(21) Appl. No.: 19/173,282

(22) Filed: Apr. 8, 2025

(65) Prior Publication Data

US 2025/0355338 A1 Nov. 20, 2025

(30) Foreign Application Priority Data

May 20, 2024 (JP) ................................ 2024-082088

(51) Int. Cl.
*G03B 27/04* (2006.01)
*G01C 11/02* (2006.01)
(Continued)

(52) U.S. Cl.
CPC .............. *G03B 37/04* (2013.01); *G01C 11/02* (2013.01); *G01S 7/4814* (2013.01);
(Continued)

(58) Field of Classification Search
CPC ........ G03B 37/04; G01S 17/86; H04N 23/68; G01C 11/02
(Continued)

(56) References Cited

U.S. PATENT DOCUMENTS 9,019,342 B2 4/2015 Satoh et al.
9,756,243 B2 9/2017 Shohara et al.
(Continued)

FOREIGN PATENT DOCUMENTS

JP 2023-509137 A 3/2023
WO 2021/138427 A1 7/2021

OTHER PUBLICATIONS

European communication dated Sep. 24, 2025 in corresponding European patent application No. 25169313.1.

*Primary Examiner* — Daquan Zhao
(74) *Attorney, Agent, or Firm* — Nields, Lemack & Frame, LLC

(57) ABSTRACT

Problem:

To provide a wide-angle camera device having a wide angle of view with less distortion in a peripheral portion of an image, and with less deterioration in resolution, and a survey system capable of acquiring an image including three-dimensional point cloud data.

Resolution Means:

A wide-angle camera device includes a plurality of cameras 2a and 2b. The cameras 2a and 2b respectively include imaging lens rear groups 10a and 10b as objective lenses, imaging lens front groups 11a and 11b as image forming lenses, prisms 6a and 6b that optically couple the imaging lens rear groups and the imaging lens front groups, and image sensors 8a and 8b that optically receive images formed by the imaging lens rear groups. The plurality of cameras are integrated by the prisms being bonded or brought into close contact with each other. Angles of view of adjacent ones of the cameras partially overlap each other. Entrance pupil positions Oa and Ob of the cameras are
(Continued)

formed between the imaging lens front groups and the prisms, respectively. An intersection point of optical axes is a camera origin O.

15 Claims, 9 Drawing Sheets

(51) Int. Cl.

| | |
|---|---|
| ***G01S 7/481*** | (2006.01) |
| ***G01S 17/86*** | (2020.01) |
| ***G01S 17/89*** | (2020.01) |
| ***G03B 17/17*** | (2021.01) |
| ***G03B 37/04*** | (2021.01) |
| ***H04N 23/698*** | (2023.01) |

(52) U.S. Cl.
CPC ............ *G01S 7/4817* (2013.01); *G01S 17/86* (2020.01); *G01S 17/89* (2013.01); *G03B 17/17* (2013.01); *H04N 23/698* (2023.01)

(58) Field of Classification Search
USPC ............ 348/47, 48, 49, 50, 65, 61, 153, 159
See application file for complete search history.

(56) References Cited

U.S. PATENT DOCUMENTS

2010/0283837 A1* 11/2010 Oohchida .............. G03B 35/08 348/47
2015/0373279 A1* 12/2015 Osborne ............ G02B 13/0075 348/36
2017/0268876 A1 9/2017 Lienhart et al.
2017/0315336 A1 11/2017 Masuda et al.
2018/0059380 A1* 3/2018 Nagatoshi .............. G02B 13/16
2022/0086316 A1 3/2022 Toriumi et al.

* cited by examiner

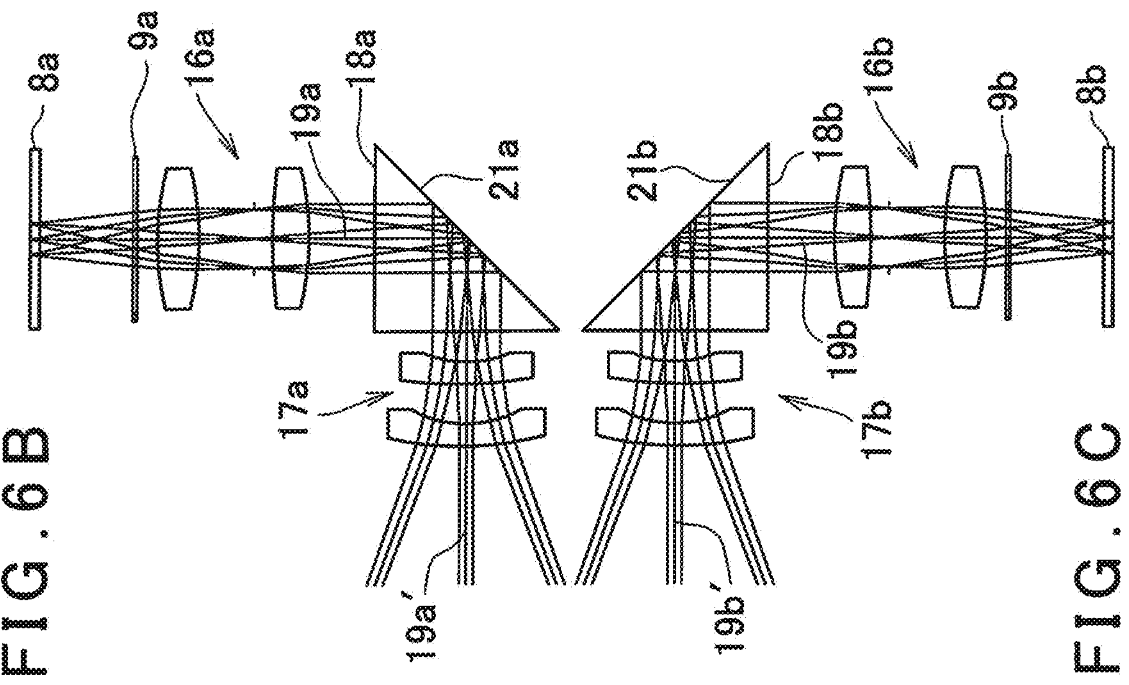
FIG. 6B
FIG. 6C
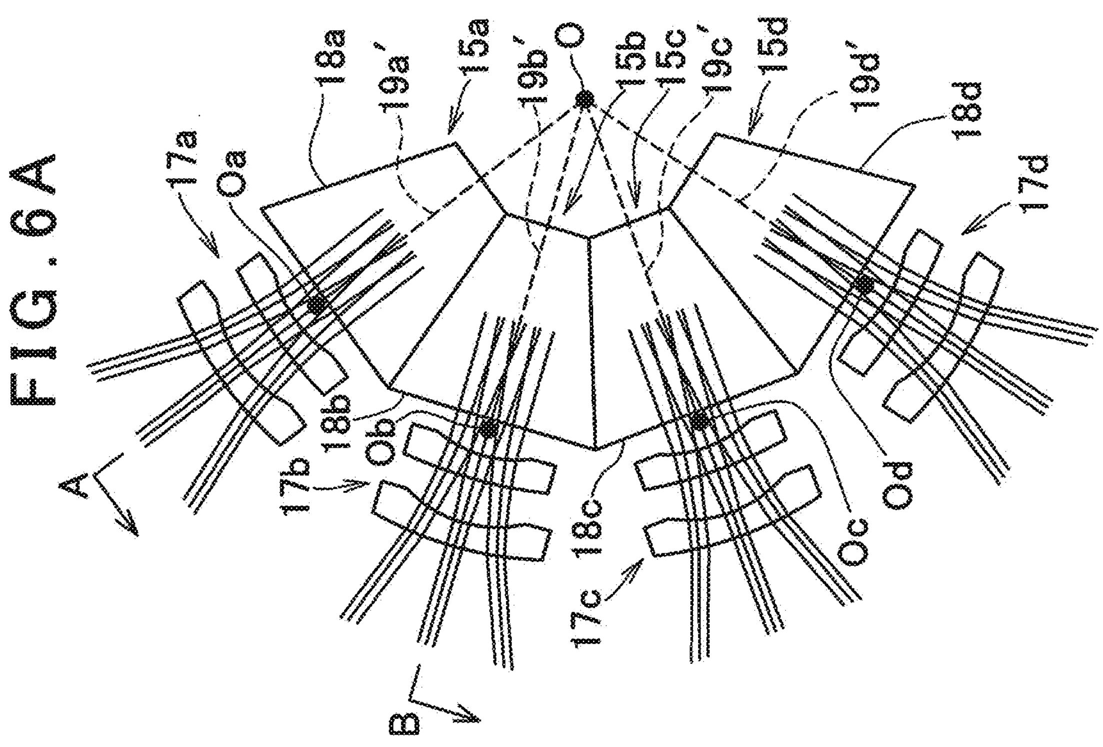
FIG. 6A

WIDE-ANGLE CAMERA DEVICE AND SURVEY SYSTEM

TECHNICAL FIELD

The present invention relates to a wide-angle camera device that acquires an image at a wide angle of view, and a survey system that acquires point cloud data by a laser scanner and combines the point cloud data with the image to acquire an image including three-dimensional coordinates.

BACKGROUND ART

Examples of a surveying device for acquiring the shape or three-dimensional point cloud data of an object to be measured include a laser scanner.

The laser scanner can acquire the point cloud data over a wide range. By acquiring the three-dimensional point cloud data, the laser scanner can measure the three-dimensional shape of the object to be measured over a wide range. Further, the laser scanner acquires an image of the object to be measured and combines the image of the object to be measured with the point cloud data to create an image including three-dimensional coordinates. As a result, understanding and viewability of measurement results are improved.

A wide-angle camera is used as a camera for acquiring an image covering a measuring range of the laser scanner. Normally, the wide-angle camera has a wide-angle lens such as a fish-eye lens, and captures an image over a wide range, for example, at an angle of view of 180° or more. However, when the image is captured by the wide-angle lens, a peripheral portion of the image has an increased distortion or a reduced resolution.

Therefore, when the image is combined with the point cloud data, pixels of the image largely deviate from corresponding measuring points of the point cloud in the peripheral portion, and the coloring accuracy and resolution of the point cloud data with the image deteriorate.

CITATION LIST

Patent Literature

Patent Document 1: JP 2023-509137 T

SUMMARY

Technical Problem

The present invention provides a wide-angle camera device having a wide angle of view with less distortion in a peripheral portion of an image, and with less deterioration in resolution, and a survey system capable of acquiring an image including three-dimensional point cloud data.

Solution to Problem

The present invention relates to a wide-angle camera device including a plurality of cameras. Each of the plurality of cameras includes an imaging lens rear group as an objective lens, an imaging lens front group as an imaging forming lens, a prism configured to optically couple the imaging lens rear group and the imaging lens front group, and an image sensor configured to optically receive an image formed by the imaging lens rear group. The prisms are bonded or brought into close contact with each other to integrate the plurality of cameras. Angles of view of adjacent ones of the cameras partially overlap each other. An entrance pupil position of each of the cameras is formed between the imaging lens front group and the prism. An intersection point of optical axes is a camera origin.

Further, in the wide-angle camera device according to the present invention, the wide-angle camera device includes two cameras. The prisms have a reflection surface, and the optical axes of the cameras are deflected by the reflection surface. The imaging lens rear group is provided on one of the deflected optical axes, the imaging lens front group is provided on the other of the deflected optical axes, and the prisms of the two cameras are integrated by the reflection surfaces being bonded or brought into close contact with each other.

Further, in the wide-angle camera device according to the present invention, the wide-angle camera device includes three cameras arranged in the same plane. A center prism of the camera arranged at a center has a three-dimensional shape formed by six surfaces. The optical axis of the camera at the center passes straight through the prism. The prisms of the other two cameras have reflection surfaces configured to deflect the optical axes of the cameras, respectively. The three cameras are integrated by the reflection surfaces of the prisms of the other two cameras being bonded or brought into close contact with two opposing surfaces of the center prism, respectively.

Further, in the wide-angle camera device according to the present invention, the wide-angle camera device includes a plurality of the cameras arranged radially at a predetermined angular interval in the same plane. A planar shape of the prism of each of the cameras is a trapezoidal shape, and the plurality of cameras are integrated by the prisms adjacent to each other being sequentially bonded or brought into close contact with each other.

Further, in the wide-angle camera device according to the present invention, the prism has a reflection surface, and the reflection surface deflects the optical axis of the camera in a direction perpendicular to the same plane.

Further, in the wide-angle camera device according to the present invention, deflection directions, by the reflection surfaces, of the optical axes of the cameras adjacent to each other are opposite to each other.

Further, the present invention relates to a survey system including any one of the wide-angle camera devices described above, and a surveying device provided on a tripod. The wide-angle camera device is integrally provided in the surveying device. The surveying device has a machine center, and the wide-angle camera device has a camera origin. The surveying device is rotatable around a center line passing through the camera origin, and an offset distance between the machine center and the camera origin is known.

Further, in the survey system according to the present invention, the surveying device includes a distance measuring unit configured to emit distance measuring light and receive reflected distance measuring light reflected from an object to be measured, a rotation unit configured to cause the distance measuring light to be emitted, a vertical rotation drive unit configured to rotate the rotation unit in a vertical direction, a surveying device main body including the rotation unit, a horizontal rotation drive unit configured to rotate the surveying device main body in a horizontal direction, an angle measuring unit configured to detect an emission direction of the distance measuring light, and an arithmetic control unit configured to control driving of the vertical rotation drive unit and the horizontal rotation drive unit, and to calculate three-dimensional point cloud data based on a light reception result of the reflected distance measuring light and a detection result of the angle measuring unit. Based on the offset distance, the arithmetic control unit converts the point cloud data into point cloud data having the camera origin as a reference, and combines the converted point cloud data with a wide-angle image acquired by the wide-angle camera device.

Further, in the survey system according to the present invention, the wide-angle camera device is provided at a side surface of the surveying device.

Furthermore, in the survey system according to the present invention, the wide-angle camera device is provided at an upper surface of the surveying device.

Advantageous Effects of Invention

The present invention provides a plurality of cameras each including an imaging lens rear group as an objective lens, an imaging lens front group as an imaging forming lens, a prism configured to optically couple the imaging lens rear group and the imaging lens front group, and an image sensor configured to optically receive an image formed by the imaging lens rear group. The prisms are bonded or brought into close contact with each other to integrate the plurality of cameras, angles of view of adjacent ones of the cameras partially overlap each other, an entrance pupil position of each of the cameras is formed between the imaging lens front group and the prism, and an intersection point of optical axes is a camera origin. With this configuration, it is possible to acquire a wide-angle image having no parallax or substantially no parallax.

Further, the present invention provides a survey system including any one of the wide-angle camera devices described above, and a surveying device provided on a tripod. The wide-angle camera device is integrally provided in the surveying device, the surveying device has a machine center, the wide-angle camera device has a camera origin, the surveying device is rotatable around a center line passing through the camera origin, and an offset distance between the machine center and the camera origin is known. With this configuration, it is possible to acquire a wide-angle image or a full panoramic image having no parallax or substantially no parallax, and also to achieve an excellent effect of making it possible to combine point cloud data with the wide-angle image or the full panoramic image, the point cloud data and the wide-angle image or the full panoramic image being acquired based on a known relationship.

BRIEF DESCRIPTION OF DRAWINGS

FIG. 6(A) is a diagram illustrating an optical system of a wide-angle camera device according to a third embodiment, FIG. 6(B) is a view seen from an arrow A in FIG. 6(A), and FIG. 6(C) is a view seen from an arrow B in FIG. 6(B).

DESCRIPTION OF EMBODIMENTS

Embodiments of the present invention will be described next with reference to the drawings.

Figure 1:
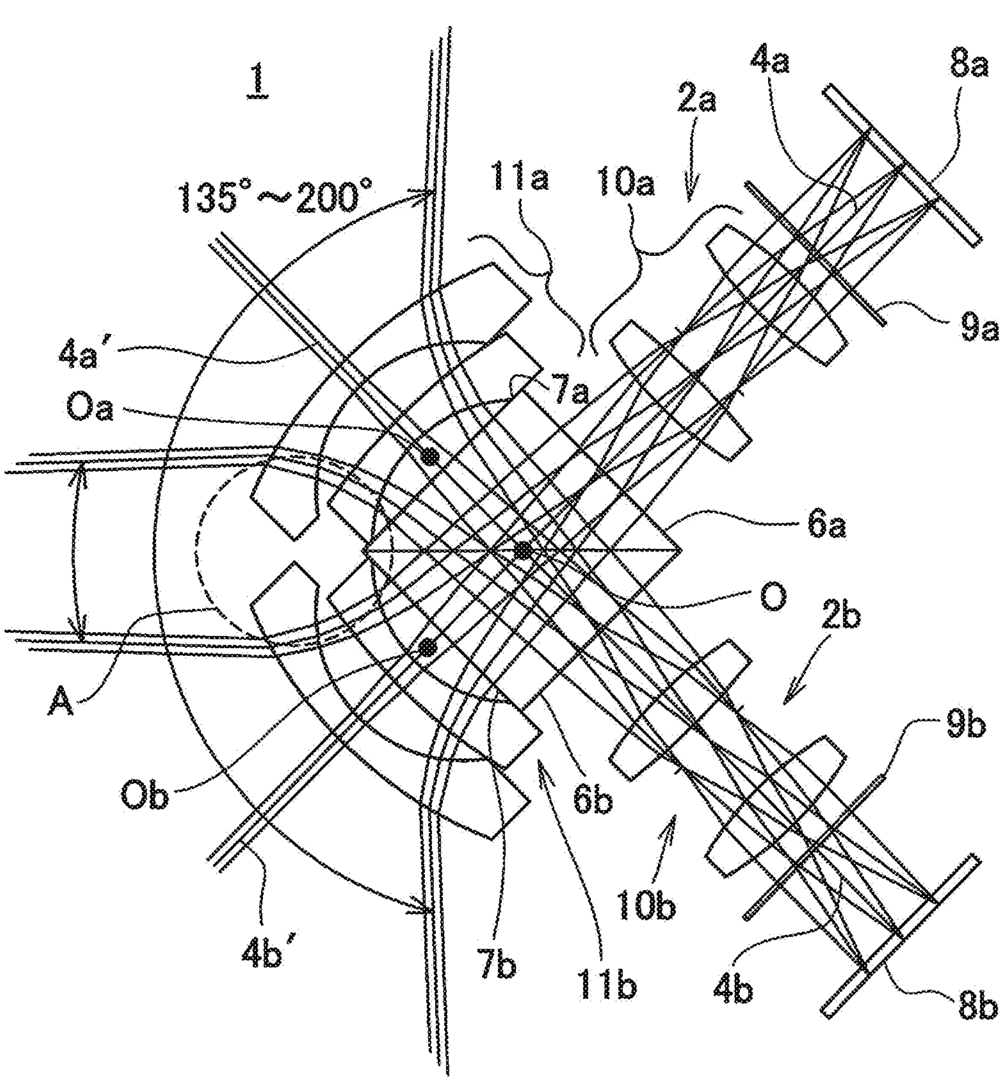
FIG. 1 is a diagram illustrating an optical system of a wide-angle camera device according to a first embodiment.

FIG. 1 is a diagram illustrating a wide-angle camera device according to a first embodiment of the present invention.

Note that FIG. 1 illustrates an optical system of the wide-angle camera device, and structures such as a case for accommodating the optical system and holding members for holding optical members are not illustrated.

A wide-angle camera device 1 according to the first embodiment includes an imaging unit 2 including two cameras, that is, a first camera 2*a* and a second camera 2*b*.

Optical axes 4*a* and 4*b* of the first and second cameras 2*a* and 2*b* are arranged in the same plane (vertical plane) (on a vertical plane), and intersect each other at the angle of 90°, and prisms 6*a* and 6*b* are provided at an intersection point between the optical axes 4*a* and 4*b*. The prisms 6*a* and 6*b* are bonded or brought into close contact with each other at their reflection surfaces. Note that the term "close contact" includes a state of physical contact and a state of having a slight gap between two objects.

The optical axis 4*a* of the first camera 2*a* and the optical axis 4*b* of the second camera 2*b* are deflected at a right angle in directions away from each other by the reflection surfaces of the prisms 6*a* and 6*b*, respectively, and the angle formed by the deflected optical axes 4*a* and 4*b* (hereinafter referred to as deflected optical axes 4*a*' and 4*b*') is 90°.

The intersection point between the optical axis 4*a* and the optical axis 4*b* is a camera origin O of the wide-angle camera device 1, and the camera origin O is located on the reflection surfaces of the prisms 6*a* and 6*b*.

The first and second cameras 2*a* and 2*b* are arranged symmetrically with respect to the reflection surfaces.

First, the first camera 2*a* will be described.

An image sensor 8*a*, an IR cut filter 9*a*, and an imaging lens rear group 10*a* as an image forming lens are disposed on the optical axis 4*a*, that is, one of the optical axes of the first camera 2*a*, deflected by the reflection surface.

The imaging sensor 8*a* is a CCD or CMOS sensor, which is an assembly of pixels, and the position of each of the pixels can be identified on the imaging sensor 8*a*. For example, each of the pixels has pixel coordinates having the center of the imaging sensor 8*a* as the origin, and the position of each of the pixels on the imaging sensor 8*a* can be identified by the pixel coordinates. Note that a position through which the optical axis 4*a* passes may be set as the origin.

An imaging lens front group 11*a* as an objective lens is disposed on the optical axis 4*a*', that is, the other optical axis of the first camera 2*a*, deflected by the reflection surface.

The imaging lens front group 11*a* is provided to be as close as possible to the prism 6*a*. In the diagram, the imaging lens front group 11*a* is provided in close contact with an incident surface 7*a* of the prism 6*a*.

In FIG. 1, Oa indicates an entrance pupil position of the first camera 2*a*. The entrance pupil position Oa is located between the incident surface 7*a* and the imaging lens front group 11*a*.

With the configuration in which the imaging lens front group 11*a* is brought into close contact with the incident surface 7*a* of the prism 6*a*, the distance between the entrance pupil position Oa and the camera origin O can be minimized. The distance between the entrance pupil position Oa and the camera origin O is known.

The angle of view in the vertical direction of the first camera 2*a* when used alone is from approximately 90° to 110°, and is set to, for example, 96° in the drawing.

The second camera 2*b* has a similar configuration to that of the first camera 2*a*. An image sensor 8*b*, an IR cut filter 9*b*, and an imaging lens rear group 10*b* are disposed on the optical axis 4*b* of the second camera 2*b*, and an imaging lens front group 11*b* is disposed on the deflected optical axis 4*b'*.

Similarly to the first camera 2*a*, the imaging lens front group 11*a* is also provided in close contact with an incident surface 7*b* of the prism 6*b*, and the distance between an entrance pupil position Ob of the second camera 2*b* and the camera origin O is minimized and known.

The angle of view in the vertical direction of the second camera 2*b* when used alone is also from approximately 90° to approximately 110°, and is set to, for example, 96° in the drawing.

The angle of view of the first camera 2*a* and the angle of view of the second camera 2*b* are set so as to partially overlap each other in a boundary portion, and the overlapping angle of view is appropriately selected based on the angle of view of each of the cameras, the combined angle of view required for the wide-angle camera device 1, the coloring accuracy, the resolution, and the like, but is normally approximately from 0° to 15°.

Therefore, the combined angle of view of the first and second cameras 2*a* and 2*b* is set so as to cover a range from 135° to 200° in the vertical direction.

The imaging lens front groups 11*a* and 11*b* are provided in close contact with surfaces of the prisms 6*a* and 6*b* adjacent to the imaging lens front groups 11*a* and 11*b*, respectively. Thus, adjacent portions of the imaging lens front groups 11*a* and 11*b* may interfere with each other.

In this case, the adjacent portions of the imaging lens front groups 11*a* and 11*b* are subjected to appropriate processing such as cutting, chamfering, or stepped processing, in order to prevent the interference between the imaging lens front groups 11*a* and 11*b* (see a portion A in FIG. 1).

Note that it is needless to say that when processing the imaging lens front groups 11*a* and 11*b*, a portion to be cut and the shape of the portion to be cut are selected so as not to impair the optical action of the imaging lens front groups 11*a* and 11*b*.

The image sensors 8*a* and 8*b* are located at known positions with respect to the camera origin O.

The optical characteristics of the imaging lens front groups 11*a* and 11*b* are set such that the horizontal angles of view of the imaging lens front groups 11*a* and 11*b* are approximately from 50° to 150°, respectively.

Therefore, the angle of view of the wide-angle camera device 1 is approximately from 135° to 200° in the vertical direction and approximately from 50° to 150° in the horizontal direction.

Subsequently, light incident from the imaging lens front group 11*a* is reflected by the prism 6*a*, passes through the IR cut filter 9*a* via the imaging lens rear group 10*a*, and forms an image on the image sensor 8*a*.

Further, background light incident from the imaging lens front group 11*b* is reflected by the prism 6*b*, passes through the IR cut filter 9*b* via the imaging lens rear group 10*b*, and forms an image on the image sensor 8*b*.

Therefore, an image acquired by the first camera 2*a* and having the angle of view of 96° in the vertical direction and an angle of view from 50° to 150° in the horizontal direction is formed on the image sensor 8*a*, and an image acquired by the second camera 2*b* and having the angle of view of 96° in the vertical direction and an angle of view from 50° to 150° in the horizontal direction is formed on the image sensor 8*b*.

Further, the deflected optical axes 4*a*' and 4*b*' have a known relationship, and the angle of view of the first camera 2*a* in the vertical direction and the angle of view of the second camera 2*b* in the vertical direction overlap each other at an angle of view from 0° to 15° in the boundary portion. Thus, the images acquired by the image sensors 8*a* and 8*b* can be easily combined based on the known relationship between the deflected optical axes 4*a*' and 4*b*' and on the overlapping portions of the images.

Therefore, the wide-angle camera device 1 can acquire a wide-angle image having an angle of view from 135° to 200° in the vertical direction and an angle of view from 50° to 150° in the horizontal direction.

Further, although the wide-angle camera device 1 has the wide angle of view having the angle of view from 135° to 200° in the vertical direction and the angle of view from 50° to 150° in the horizontal direction, the angle of view of each of the first and second cameras 2*a* and 2*b* is 96° in the vertical direction and is from 50° to 150° in the horizontal direction. Thus, compared with a wide-angle camera capable of capturing an image at the angle of view of the wide-angle camera device 1 even when used alone, the wide-angle camera device 1 can suppress distortion in a peripheral portion of the image and deterioration in the resolution.

Furthermore, since the distances between the entrance pupil positions Oa and Ob and the camera origin O are small, parallax between the first and second cameras 2*a* and 2*b* is small. Thus, when the images of the first and second cameras 2*a* and 2*b* are combined (particularly with a subject at a short distance), it is possible to suppress the deviation between pixels, thus improving the resolution.

Figure 2:
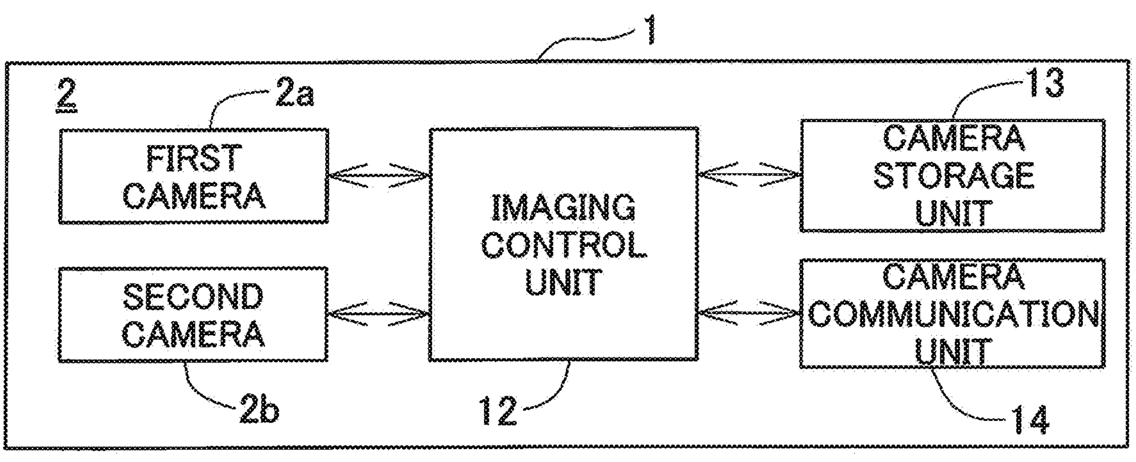
FIG. 2 is a schematic diagram of a configuration of the wide-angle camera device.

FIG. 2 illustrates a schematic configuration of the wide-angle camera device 1.

The wide-angle camera device 1 includes an imaging control unit 12 that controls imaging by the first and second cameras 2*a* and 2*b* and performs image processing, a camera storage unit 13, and a camera communication unit 14.

As the imaging control unit 12, a CPU dedicated to this embodiment, a general-purpose CPU, an embedded CPU, or a microprocessor is used, for example. As the camera storage unit 13, a semiconductor storage memory such as a RAM, a ROM, a flash ROM, or a DRAM is used.

The imaging control unit 12 performs imaging control and synchronization control of the first and second cameras 2*a* and 2*b*, and further performs image processing such as composition of the images acquired by the first and second cameras 2*a* and 2*b* to create a wide-angle image.

The camera storage unit 13 stores programs necessary for acquiring the wide-angle image such as an imaging control program and an image processing program. The camera storage unit 13 also stores image data acquired by the first and second cameras 2*a* and 2*b*, and the acquired wide-angle images.

The camera communication unit 14 transmits the created wide-angle images to another device such as a personal computer or a surveying device. Note that when the wide-angle camera device 1 is used alone, the camera communication unit 14 can be omitted.

When the wide-angle camera device 1 according to the first embodiment is used, the horizontal direction may be fixed and a wide-angle image in only one direction may be acquired. Alternatively, the wide-angle camera device 1 may be rotated in the horizontal direction about a vertical line passing through the camera origin O to acquire a full panoramic image.

In the case of acquiring the full panoramic image, the wide-angle camera device 1 is intermittently rotated in the horizontal direction by a predetermined angular step each time. An image is captured at each step while causing the images to overlap each other between the steps, and the captured images are combined. Here, the predetermined angular step is determined based on the selected horizontal angles of view of the first and second cameras 2*a* and 2*b*, the angle of view (overlapping angle of view) by which the images overlap each other in the horizontal direction, the required image resolution, and the required coloring accuracy.

Figure 3:
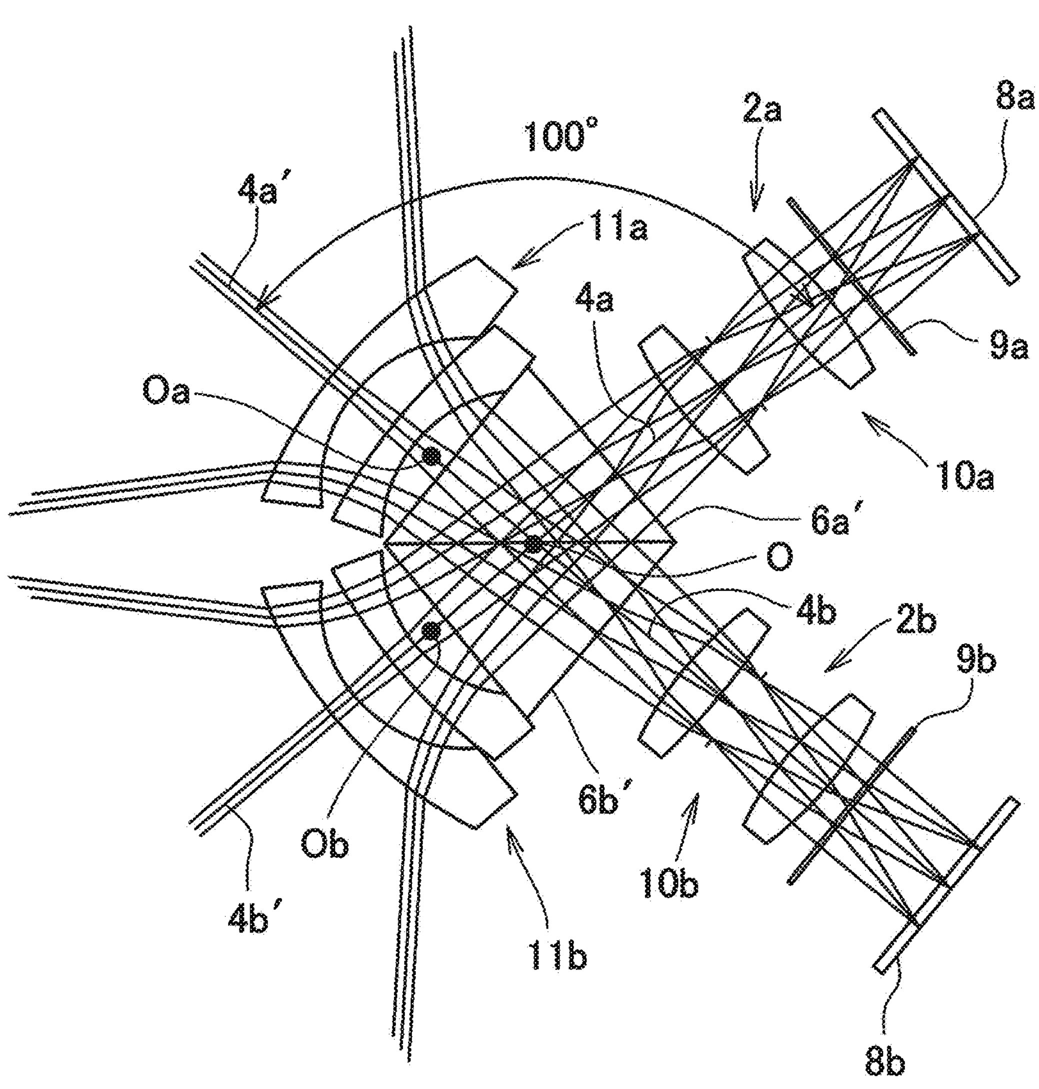
FIG. 3 is a diagram illustrating an optical system of a wide-angle camera device according to a modified example of the first embodiment.

FIG. 3 illustrates a modified example of the first embodiment. Note that the same reference signs are appended in FIG. 3 to equivalent parts to those of FIG. 1.

As in the first embodiment, this modified example includes two cameras including the first and second cameras 2*a* and 2*b*. However, the optical axis 4*a* of the first camera 2*a* is deflected by 100° by a prism 6*a*', and the optical axis 4*b* of the second camera 2*b* is deflected by 100° by a prism 6*b*', so that the angle formed between the deflected optical axes 4*a*' and 4*b*' is 80°.

Note that the angle of the optical axis 4*a* with respect to an incident surface of the prism 6*a*' is 90°, and the angle of the deflected optical axis 4*a*' with respect to the incident surface of the prism 6*a*' is 90°. Similarly, the angle of the optical axis 4*b* with respect to an incident surface of the prism 6*b*' is 90°, and the angle of the deflected optical axis 4*b*' with respect to the incident surface of the prism 6*b*' is 90°.

In this embodiment also, it is needless to say that the adjacent portions of the imaging lens front groups 11*a* and 11*b* are appropriately processed by cutting, chamfering, stepped processing, or the like in order to prevent the interference between the imaging lens front groups 11*a* and 11*b*.

In the modified example, by setting the deflection angles of the prisms 6*a*' and 6*b*' to 100°, the angle between the deflected optical axes 4*a*' and 4*b*' is reduced, and the angle of view in the vertical direction of the wide-angle camera device 1 is also reduced. In addition, the deflection angles by the prisms 6*a*' and 6*b*' may be reduced, for example, to 80°. In this case, the angle between the deflected optical axes 4*a*' and 4*b*' increases, and the angle of view in the vertical direction of the wide-angle camera device 1 also increases.

On the other hand, by increasing the deflection angles of the deflected optical axes 4*a*' and 4*b*' deflected by the prisms 6*a*' and 6*b*', respectively, the dimension of the wide-angle camera device 1 in the depth direction is reduced, and the dimension thereof in the vertical direction is increased. Therefore, the deflection angles by the prisms 6*a*' and 6*b*' are appropriately selected in accordance with the required design specifications of the cameras.

Figure 4:
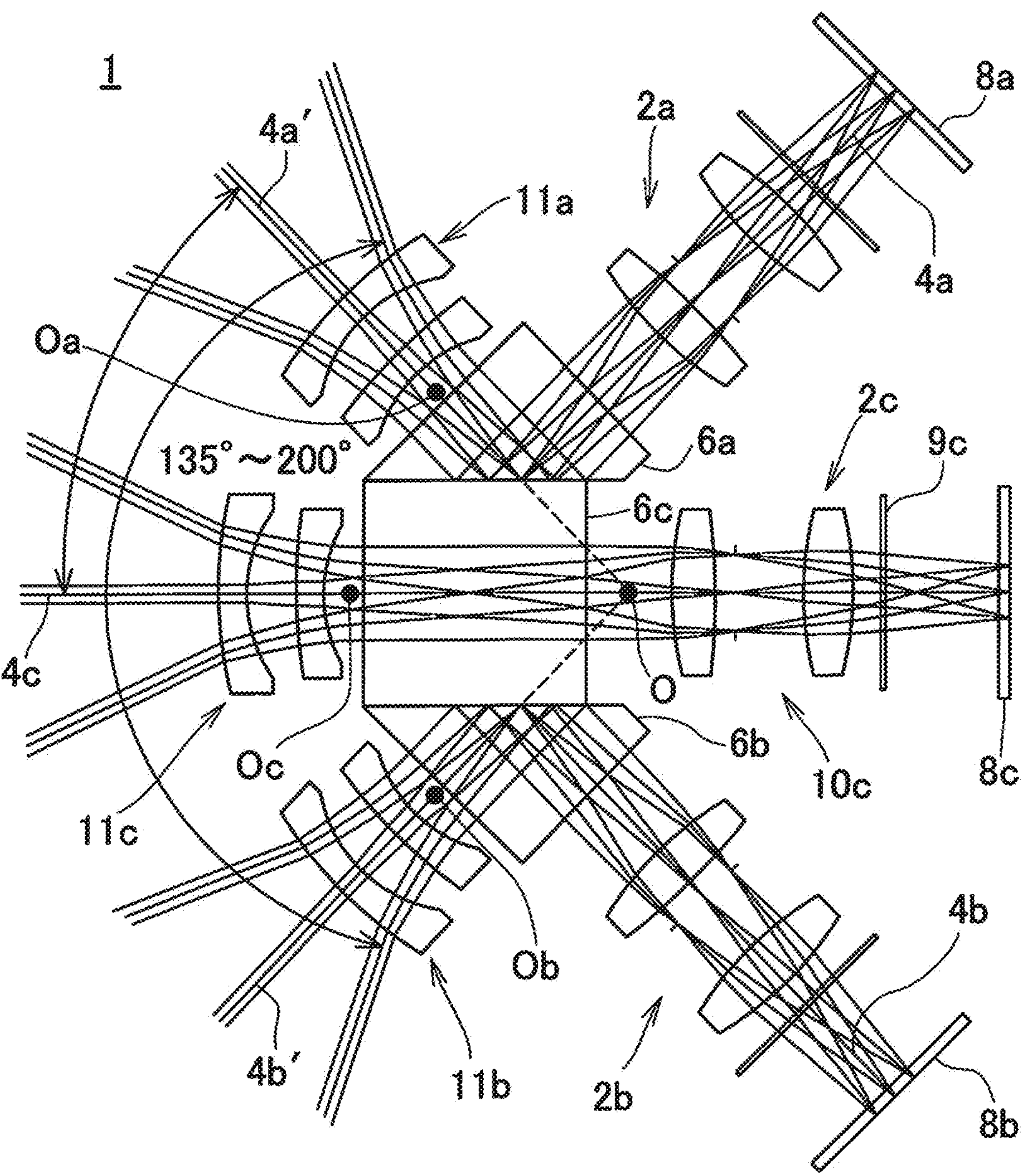
FIG. 4 is a diagram illustrating an optical system of a wide-angle camera device according to a second embodiment.

FIG. 4 illustrates a second embodiment.

In the second embodiment, the wide-angle camera device 1 includes three cameras including the first camera 2*a*, the second camera 2*b*, and a third camera 2*c*, which are arranged in the same plane.

In the second embodiment, the first and second cameras 2*a* and 2*b* have similar configurations to those of the first and second cameras 2*a* and 2*b* in the first embodiment, respectively. Note that the same reference signs are appended in FIG. 4 to equivalent parts to those of FIG. 1.

The first to third cameras 2*a* to 2*c* are arranged in the vertical direction.

The third camera 2*c* is arranged at the center, and the first and second cameras 2*a* and 2*b* are symmetrically arranged above and below the third camera 2*c*, respectively. An optical axis 4*c* of the third camera 2*c*, the optical axis 4*a* of the first camera 2*a*, and the optical axis 4*b* of the second camera 2*b* are present in the same vertical plane.

The third camera 2*c* will be described.

The third camera 2*c* includes an imaging lens front group 11*c*, a prism 6*c*, an imaging lens rear group 10*c*, an IR cut filter 9*c*, and an image sensor 8*c*, which are linearly arranged on the optical axis 4*c*. The imaging lens front group 11*c* and the imaging lens rear group 10*c* are optically coupled to each other by the prism 6*c*.

The imaging lens front group 11*c* has a similar configuration to those of the imaging lens front groups 11*a* and 11*b*, and the imaging lens rear group 10*c* has a similar configuration to those of the imaging lens rear groups 10*a* and 10*b*.

The prism 6*c* has a three-dimensional shape formed by six flat surfaces. In this embodiment, the prism 6*c* has a rectangular parallelepiped shape having six surfaces orthogonal to each other, and the upper and lower surfaces and the front and rear surfaces are parallel to each other.

The prism 6*a* of the first camera 2*a* is bonded or brought into close contact with one of opposing surfaces of the prism 6*c*, that is, the upper surface of the prism 6*c*, and the prism 6*b* of the second camera side 2*b* is bonded or brought into close contact with the other opposing surface, that is, the lower surface of the prism 6*c*. The optical axis 4*c* of the third camera 2*c* is perpendicular to the front surface and the rear surface of the prism 6*c*.

The prism 6*c* has no deflecting effect on the optical axis 4*c*, and the prism 6*c* has an optical path length equivalent to those of the prisms 6*a* and 6*b*. Therefore, the first to third cameras 2*a* to 2*c* have similar optical performances.

The prism 6*a* of the first camera 2*a* deflects the optical axis 4*a* at a right angle, the prism 6*b* of the second camera 2*b* deflects the optical axis 4*b* at a right angle, and the interval between the deflected optical axis 4*a*' and the optical axis 4*a* and the interval between the optical axis 4*b* and the deflected optical axis 4*b*' are 45°, respectively.

In FIG. 4, Oa, Ob, and Oc indicate entrance pupil positions, respectively. An extension line of the deflection optical axis 4*a*' and an extension line of the deflection optical axis 4*b*' intersect with each other on the optical axis 4*c*, and an intersection point O corresponds to the camera origin.

Further, the entrance pupil position Oa, the entrance pupil position Ob, and an entrance pupil position Oc are present on the same circular arc or substantially on the same circular arc centered around the camera origin O, and the radius of the circular arc is known. When the entrance pupil positions Oa, Ob, and Oc are present on the same circular arc, calculations become easy when performing image processing.

In the second embodiment, the wide-angle camera device 1 includes the three cameras and is set so as to cover the vertical angle of view ranging from 135° to 200°.

In the second embodiment, the vertical angle of view of each of the first to third cameras 2*a* to 2*c* is set to be from approximately 30° to approximately 150°, and the horizontal angle of view (i.e., the horizontal angle of view of the wide-angle camera device 1) is set to be from approximately 30° to approximately 150°.

When combining images acquired by the first to third cameras 2*a* to 2*c*, the images are caused to overlap each other by a predetermined angle of view in both the vertical direction and the horizontal direction, in the same manner as in the first embodiment.

In the second embodiment, the wide-angle camera device 1 includes the three cameras, and the angle of view of each of the cameras can be made small. Thus, it is possible to further suppress the distortion in the peripheral portion of the image and the deterioration in the resolution.

Further, the prisms 6*a*, 6*b*, and 6*c* are interposed in the optical systems of the first to third cameras 2*a* to 2*c*, respectively, to form a space for accommodating the third camera 2*c*. Thus, the configuration of the entire wide-angle camera device 1 can be made compact. Furthermore, the entrance pupil positions Oa, Ob, and Oc can be brought close to the camera origin O, so that parallax between the first to third cameras 2*a* to 2*c* can be reduced.

Figure 5:
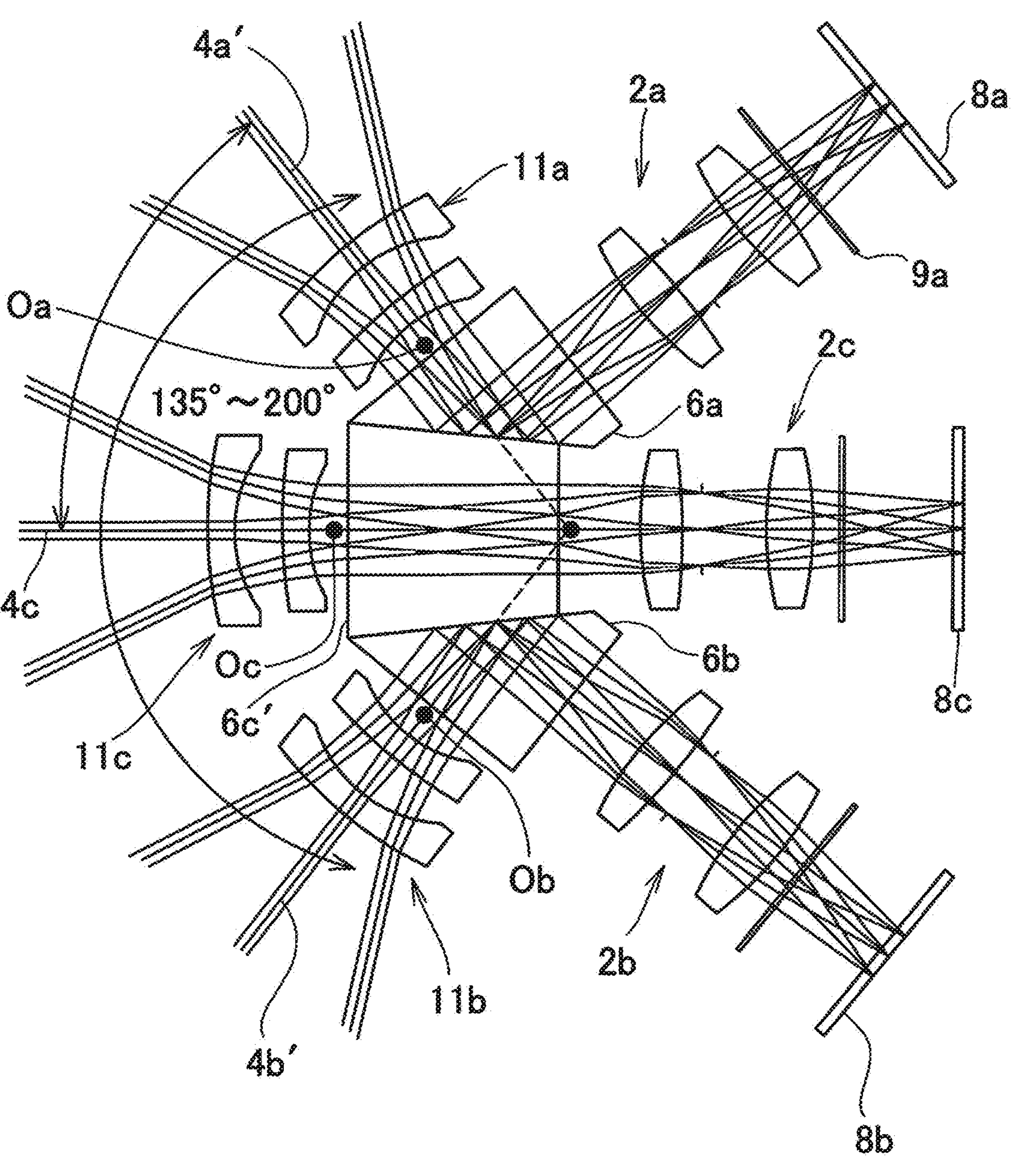
FIG. 5 is a diagram illustrating an optical system of a wide-angle camera device according to a modified example of the second embodiment.

FIG. 5 illustrates a modified example of the second embodiment.

This modified example has substantially the same configuration as that of the second embodiment. In contrast to the second embodiment, in this modified example, the shape of the prism 6*c* is changed to the shape of a prism 6*c*', thereby changing the angle between the deflected optical axis 4*a*' of the first camera 2*a* and the optical axis 4*c* of the third camera 2*c*, and the angle between the deflected optical axis 4*b*' of the second camera 2*b* and the optical axis 4*c* of the third camera 2*c*.

The prism 6*c*' has a three-dimensional shape formed by six flat surfaces, and the upper surface and the lower surface of the prism 6*c*', that is, surfaces of the prism 6*c*' with which the prism 6*a* and the prism 6*b* are respectively bonded or brought close contact are inclined.

In FIG. 5, the upper surface and the lower surface of the prism 6*c*' are inclined so as to approach each other toward the image sensor 8*c*. As a result, the angle between the deflected optical axis 4*a*' and the optical axis 4*c* and the angle between the deflected optical axis 4*b*' and the optical axis 4*c* are increased. In the drawing, the angle between the optical axes is set to 50°.

Note that the angle between the optical axes is not limited to 50°, and may be an appropriate angle ranging from 50° to 70°.

The upper surface and the lower surface of the prism 6*c*' may be inclined so as to separate from each other toward the image sensor 8*c*. In this case, the angle between the deflected optical axis 4*a*' and the optical axis 4*c* and the angle between the deflected optical axis 4*b*' and the optical axis 4*c* are reduced.

The angles between the deflected optical axis 4*a*', the optical axis 4*c*, and the deflected optical axis 4*b*' are appropriately selected in accordance with the required design specifications of the cameras.

In the modified example of the second embodiment, the angle of view of each of the first to third cameras 2*a* to 2*c* is set to be from 30° to 135°.

Therefore, the angle of view in the vertical direction of the wide-angle camera device 1 is from 135° to 200°, and the horizontal angle of view of the wide-angle camera device 1 is from 30° to 135°.

When combining images acquired by the first to third cameras 2*a* to 2*c*, the images are caused to overlap each other by a predetermined angle of view in both the vertical direction and the horizontal direction, in the same manner as in the first embodiment.

Note that, in the modified example of the second embodiment, as illustrated in the modified example of the first embodiment, the shape of the prism 6*c*' may be changed so that the deflection angle becomes an angle other than 90°.

FIGS. 6(A), 6(B), and 6(C) illustrate a third embodiment. FIG. 6(A) is an elevation view, FIG. 6(B) is a view seen from an arrow A in FIG. 6(A), and FIG. 6(C) is a view seen from an arrow B in FIG. 6(A).

In the third embodiment, the wide-angle camera device 1 includes four cameras including first to fourth cameras 15*a* to 15*d*, and the first to fourth cameras 15*a* to 15*d* have similar configurations. Note that the same reference signs are appended in FIGS. 6(A), 6(B), and 6(C) to equivalent parts to those of FIG. 1.

Imaging lens front groups 17*a* to 17*d* of the first to fourth cameras 15*a* to 15*d* are arranged in the same vertical plane and radially arranged at predetermined angular intervals (35° intervals in the drawing) around the camera origin O as the center. The four cameras are integrated with each other by prisms 18*a* to 18*d* of the first to fourth cameras 15*a* to 15*d* being sequentially bonded or brought into close contact with each other.

First, the first camera 15*a* will be described with reference to FIGS. 6(A) and 6(B).

The first camera 15*a* includes an imaging lens rear group 16*a* and the imaging lens front group 17*a*, and the imaging lens rear group 16*a* and the imaging lens front group 17*a* are optically coupled to each other via the prism 18*a*.

The prism 18*a* has a reflection surface 21*a*, and an optical axis 19*a* of the first camera 15*a* is deflected at a right angle by the reflection surface 21*a* (deflected perpendicularly to the paper surface in FIG. 6(A)). The planar shape of the prism 18*a* is a trapezoidal shape. That is, opposing surfaces of the prism 18*a* are inclined so as to approach the center (the camera origin O). The apex angle of the trapezoidal shape corresponds to an arrangement interval angle of the first to fourth cameras 15*a* to 15*d*, and is 35° in the drawing.

As for the states of the optical axis 19*a* and a deflected optical axis 19*a*', when the paper surface of FIG. 6(A) illustrates a vertical plane, the optical axis 19*a* extends perpendicularly to the paper surface, that is, horizontally toward the reverse side of the paper surface, and the deflected optical axis 19*a*' is parallel to the paper surface, that is, included in the vertical plane.

The imaging lens rear group 16*a* is provided on the optical axis 19*a*, and the imaging lens front group 17*a* is provided on the deflection optical axis 19*a*'.

The imaging lens rear group 16*a* and the imaging lens front group 17*a* have similar configurations as those of the imaging lens rear group 10*a* and the imaging lens front group 11*a*, respectively.

The angle of view of the imaging lens front group 17*a*, that is, the angle of view of the first camera 15*a* when used alone is set to be approximately from 22.5° to 60°.

Light incident through the imaging lens front group 17*a* and the prism 18*a* is transmitted through the IR cut filter 16*a* by the imaging lens rear group 9*a* to form an image on the image sensor 8*a*.

The second camera 15*b* provided adjacent to the first camera 15*a* has a similar configuration to that of the first camera 15*a*, but the deflection direction of the optical axis 19*b* by the prism 18*b* is different from that of the first camera 15*a*.

The optical axis 19*b* of the second camera 15*b* is deflected by a reflection surface 21*b* and extends perpendicularly from the paper surface to the front side. The prism 18*b* deflects the optical axis 19*b* at a right angle so that the optical axis 19*b* is included in the vertical plane.

In the third camera 15*c* adjacent to the second camera 15*b*, the deflection direction of the optical axis 19*c* by the prism 18*c* is the same as that of the first camera 15*a*.

Further, in the fourth camera 15*d* adjacent to the third camera 15*d*, the deflection direction of the optical axis 19*d* by the prism 18*d* is the same as that of the second camera 15*b*.

In other words, the deflection directions by the prisms 18*a* to 18*d* are directions opposite to each other between adjacent cameras of the first to fourth cameras 15*a* to 15*d*.

Therefore, the imaging lens rear groups 16*a* to 16*d* of the first to fourth cameras 15*a* to 15*d* alternately extend in the opposite directions.

The first to fourth cameras 15*a* to 15*d* are disposed so that the adjacent prisms 18*a* to 18*d* are sequentially brought into close contact with each other (see FIG. 6(A)), and extension lines of the deflection optical axes 19*a*' to 19*d*' intersect at the camera origin O. Further, entrance pupil positions Oa to Od of the first to fourth cameras 15*a* to 15*d* are present on a circular arc centered around the camera origin O.

In the present embodiment, since the entrance pupil positions Oa to Od are present on the same circular arc, the symmetry of the first to fourth cameras 15*a* to 15*d* is improved, thereby making it easier to combine the images acquired by the respective cameras.

With the above-described configuration, interference between the imaging lens rear groups 16*a* and 16*d* and interference between the image sensors 8*a* and 8*d* can be avoided.

Note that if the interferences between the lenses and between the image sensors can be avoided by appropriately adjusting the lens shapes of the imaging lens rear groups 16*a* to 16*d* and the shapes of the image sensors 8*a* to 8*d*, the deflection directions of the optical axes by the prisms 18*a* to 18*d* may be the same.

The horizontal angle of view of each of the first to fourth cameras 15*a* to 15*d* is set to be approximately from 22.5° to 60°, and the horizontal angle of view of the wide-angle camera device 1 is also set to be approximately from 22.5° to 60° in a similar manner.

The vertical angle of view of the wide-angle camera device 1 is a combination of the vertical angles of view of the first to fourth cameras 15*a* to 15*d*, and is set so as to cover the range from 135° to 200°.

Here, as described above, the images acquired by the first to fourth cameras 15*a* to 15*d* are caused to overlap each other, and the overlapping angle of view between the overlapped images is determined by the required resolution of the images and the coloring accuracy.

In the third embodiment, the wide-angle camera device 1 includes the four cameras, and the angle of view of each of the cameras can be further reduced. Thus, the distortion in the peripheral portion of the image and the deterioration in the resolution can be further suppressed.

In the third embodiment, the imaging lens rear groups 16*a* to 16*d* of the radially-arranged first to fourth cameras 15*a* to 15*d* are provided on the optical axes deflected at a right angle, respectively. Thus, the distances between the entrance pupil positions Oa to Od and the camera origin O can be shortened, and parallax between the first to fourth cameras 15*a* to 15*d* can thus be reduced.

The wide-angle camera device 1 according to the present embodiment can acquire a wide-angle image having any one of the horizontal angles from 22.5° to 60° and any one of the vertical angles from 135° to 200°.

The wide-angle camera device 1 acquires images at the predetermined angular intervals around the vertical line passing through the camera origin O as the center. Then, by being rotated by 360°, the wide-angle camera device 1 can acquire a full panoramic image at any one of the vertical angles of view from 135° to 200°.

Note that it is needless to say that, in the third embodiment, two, three, five or more cameras can be integrated by appropriately selecting the apex angles of the trapezoidal shapes of the prisms 18*a* to 18*d* and the angles of view of the imaging lens rear groups 16*a* to 16*d*.

Note that when the wide-angle camera device 1 is used alone, the optical axes of the plurality of cameras may be positioned in a horizontal plane, and the wide-angle camera device 1 may have a wide angle of view in the horizontal direction.

Next, a survey system 21 according to a fourth embodiment of the present invention will be described with reference to FIGS. 7 and 8. The survey system 21 includes any one of the above-described wide-angle camera devices 1, and a surveying device 22. The wide-angle camera device 1 is provided integrally with the surveying device 22. The surveying device 22 may be a laser scanner or a total station. Note that, for the integration of the wide-angle camera device 1 and the surveying device 22, the wide-angle camera device 1 may be built in the surveying device 22, or the wide-angle camera device 1 may be unitized and externally attached to the surveying device 22.

Figure 7:
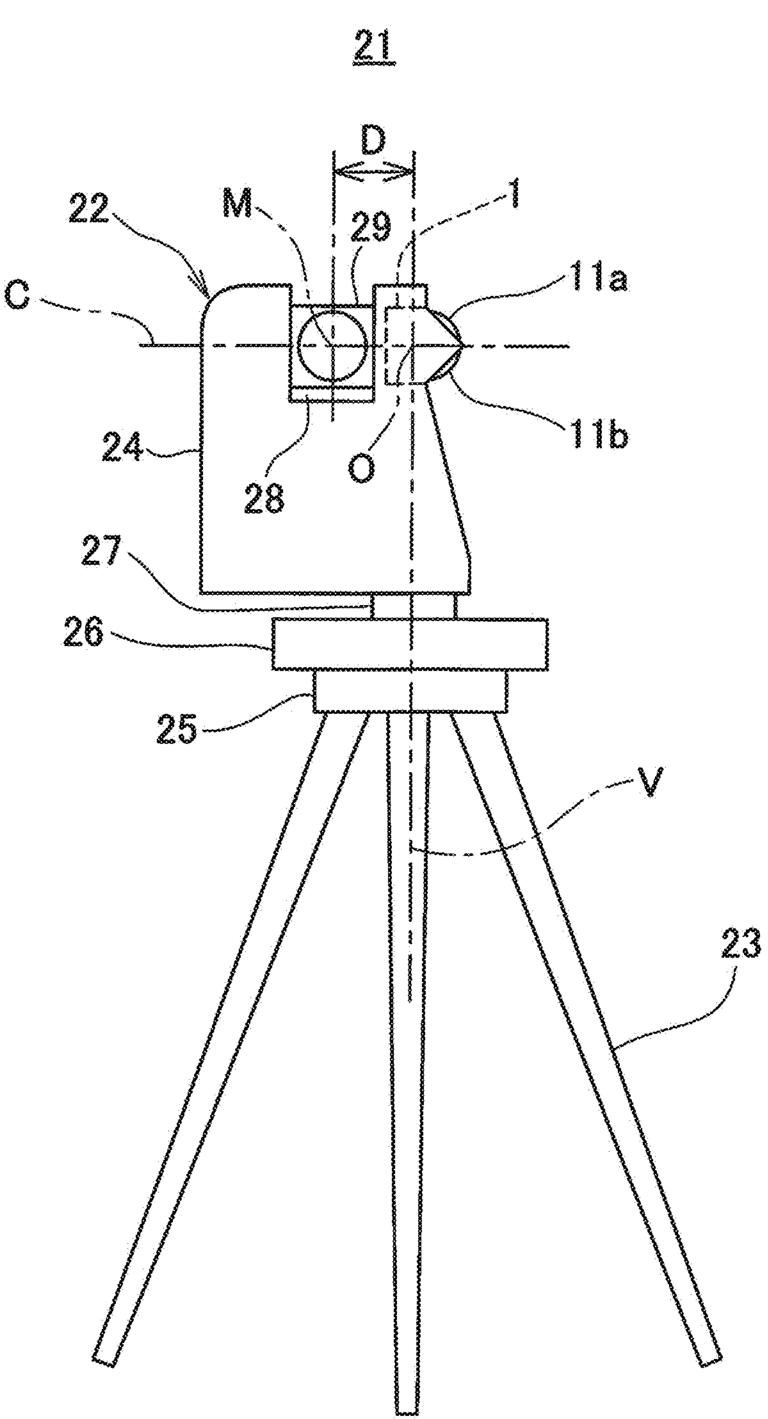
FIG. 7 is an external view of a survey system according to a fourth embodiment.
Figure 8:
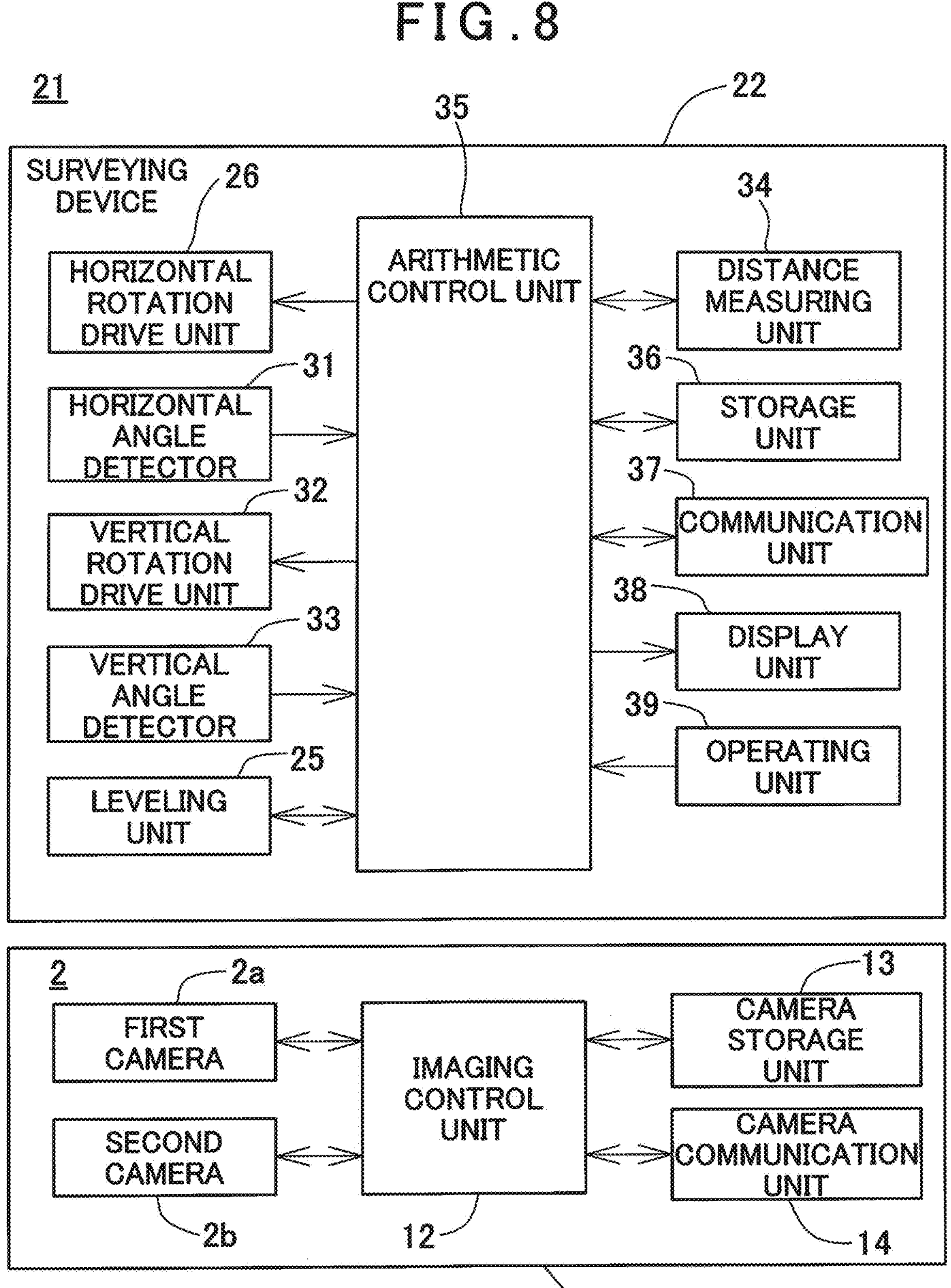
FIG. 8 is a schematic diagram of a configuration of the survey system according to the fourth embodiment.

In FIG. 7, the surveying device 22 is, for example, a laser scanner and is installed via a tripod 23. The surveying device 22 can measure three-dimensional coordinates of a desired measuring point with reference to a machine center (measuring reference point) M, and can measure three-dimensional 360° full panoramic point cloud data centered around a center line C with reference to the machine center M.

A surveying device main body 24 of the surveying device 22 accommodates the wide-angle camera device 1.

The camera origin O and the machine center M of the wide-angle camera device 1 are set so as to be located on the center line C. A distance (offset distance) D between the camera origin O and the machine center M is known.

The surveying device 22 includes a leveling unit 25 provided on the tripod 23, a horizontal rotation drive unit 26 provided on the leveling unit 25, and the surveying device main body 24. The surveying device main body 24 is coupled to the horizontal rotation drive unit 26 via a rotation shaft 27, and is rotatable in the horizontal direction via the rotation shaft 27 by the horizontal rotation drive unit 26. A center line V of the rotation shaft 27 is set so as to pass through the camera origin O.

The horizontal rotation drive unit 26 includes a rotation angle detector (not illustrated), and is capable of detecting a rotation angle of the rotation shaft 27 (i.e., a horizontal rotation angle of the surveying device main body 24).

The leveling unit 25 includes a sensor (not illustrated) for detecting the inclination of the leveling unit 25, and a motor (not illustrated) for driving a leveling screw for leveling the leveling unit 25. The leveling unit 25 horizontally levels the leveling unit 25 in an automatic manner based on a detection result of the sensor.

An upper portion of the surveying device main body 24 is formed with a recessed portion 28 whose front side, rear side and upper side are open. In the recessed portion 28, a lens barrel 29 is provided as a rotation unit. The lens barrel 29 includes a scanning mirror, and is freely rotatable about the center line C, that is, freely rotatable in the vertical direction.

A distance measuring unit 34 (described later) is provided in the lens barrel 29. The distance measuring unit 34 emits distance measuring light onto a distance measuring optical axis via the scanning mirror, and receives, via the scanning mirror, reflected distance measuring light reflected by an object to be measured. The distance measuring unit 34 measures the distance up to the object to be measured based on the time difference between the emission timing of the distance measuring light and the reception timing of the reflected distance measuring light and on the speed of light. As a result of the surveying device main body 24 rotating around the rotation shaft 27 (i.e., the center line V) in the horizontal direction in concert with the lens barrel 29 rotating around the center line C in the vertical direction, the distance measuring light can be emitted over the entire circumference of 360°, and three-dimensional 360° full panoramic point cloud data can be acquired.

Note that the machine center M of the lens barrel 29 rotates in a state of being offset by D from the rotation center (center line V).

The wide-angle camera device 1 according to any one of the first to third embodiments is accommodated in a housing of the surveying device main body 24. In the following description, it is assumed that the wide-angle camera device 1 according to the first embodiment is accommodated in the housing of the surveying device main body 24, and the description will be made with reference to FIG. 1.

The wide-angle camera device 1 is provided so that at least the objective lenses of the imaging lens front groups 11*a* and 11*b* are exposed from the housing of the surveying device main body 24.

In FIG. 7, the wide-angle camera device 1 is provided so that the objective lenses are exposed from a side surface of the surveying device main body 24. The side surface is shaped so as not to limit the field of view of the wide-angle camera device 1. FIG. 7 illustrates a state in which the side surface is inclined.

Note that the imaging lens front groups 11*a* and 11*b* may be provided at the front surface or the rear surface of the surveying device main body 24.

Then, as a result of the surveying device main body 24 being rotated by the horizontal rotation drive unit 26, the wide-angle camera device 1 can acquire a full panoramic image at a vertical angle of view from 135° to 200°.

Next, the configuration of the survey system 21 will be further described with reference to FIG. 8.

The survey system 21 includes the surveying device 22 and the wide-angle camera device 1. The surveying device 22 includes the horizontal rotation drive unit 26 that rotates the surveying device main body 24 with respect to the leveling unit 25, a horizontal angle detector 31 that detects a rotation angle (horizontal angle) of the surveying device main body 24, a vertical rotation drive unit 32 that rotates the lens barrel 29, and a vertical angle detector 33 that detects a rotation angle (vertical angle) of the lens barrel 29. The surveying device 22 further includes the distance measuring unit 34, an arithmetic control unit 35, a storage unit 36, a communication unit 37, a display unit 38, and an operating unit 39.

Note that the horizontal rotation drive unit 26 and the vertical rotation drive unit 32 constitute a drive unit of the surveying device 22, and the horizontal angle detector 31 and the vertical angle detector 33 constitute an angle measuring unit that detects an emission direction of the distance measuring light.

As the arithmetic control unit 35, a CPU dedicated to this embodiment, a general-purpose CPU, an embedded CPU, a microprocessor, or the like is used. As the storage unit 36, a semiconductor memory such as a RAM, a ROM, a flash ROM, or a DRAM, a magnetic memory such as an HDD, an optical memory such as a CDROM, or the like is used.

Note that the arithmetic control unit 35 may also serve as the imaging control unit 12 of the wide-angle camera device 1. The storage unit 36 may also serve as the camera storage unit 13 of the wide-angle camera device 1.

The storage unit 36 stores programs such as a control program for integrally controlling the surveying device 22 and the wide-angle camera device 1, a sequence program for controlling a distance measuring operation, a distance measuring program for calculating the distance by the distance measuring operation, an angle measuring program for calculating, based on detection results of the horizontal angle detector 31 and the vertical angle detector 33, an extension direction (angle) of the distance measuring optical axis, a measurement program for calculating three-dimensional coordinates of a desired measuring point based on the distance and the angle, a leveling program for causing the leveling unit 25 to perform leveling, a communication program for communicating with a remote operating device (not illustrated), a drive control program for controlling the horizontal rotation drive unit 26 and the vertical rotation drive unit 32, an imaging program for causing the imaging unit 2 (first and second cameras 2*a* and 2*b*) to acquire images, an image processing program for combining wide-angle images acquired by the first and second cameras 2*a* and 2*b* to create a full panoramic image, a composition program for combining a full panoramic image and point cloud data to create a full panoramic image including colored point cloud data or three-dimensional coordinates, and a display program for causing the display unit 38 to display measurement results and the like.

The storage unit 36 stores measurement data (distance measurement data and angle measurement data) acquired when measuring a predetermined measuring point, and three-dimensional coordinate data and three-dimensional point cloud data of a desired measuring point. The arithmetic control unit 35 expands and executes various programs stored in the storage unit 36 to perform various processes.

The communication unit 37 has a function of transmitting data from the surveying device 22 to a terminal device (not illustrated) such as a smartphone or a tablet, or receiving data for the surveying device 22 from the terminal device. The operating unit 39 enables input of measurement conditions and the like, and the display unit 38 displays a setting screen, measurement results, and the like.

Next, acquisition of point cloud data and wide-angle images by the survey system 21 will be described.

First, the surveying device 22 is installed at a reference point having known three-dimensional coordinates, and leveled by the leveling unit 25. Note that the height from the reference point to the machine center M of the surveying device main body 24 is known.

The arithmetic control unit 35 causes the distance measuring unit 34 to emit pulses of the distance measuring light at a predetermined light emission interval. The arithmetic control unit 35 also drives the horizontal rotation drive unit 26 and the vertical rotation drive unit 32 to horizontally rotate the surveying device main body 24 at a predetermined rotation speed, and also to vertically rotate the lens barrel 29 at a predetermined rotation speed.

While the distance measuring light is being emitted at a predetermined pulse interval, the surveying device main body 24 and the lens barrel 29 are rotated at constant speeds, respectively. The distance measuring light is caused to perform two-dimensional scanning as a result of the lens barrel 29 rotating in the vertical direction at the constant speed in concert with the surveying device main body 24 rotating in the horizontal direction at the constant speed.

Further, the distance is measured for each of the pulses of light, and the vertical angle and the horizontal angle are detected by the vertical angle detector 33 and the horizontal angle detector 31, respectively. As a result, it is possible to acquire distance measurement data, vertical angle data, and horizontal angle data for a point (measuring point) irradiated with the pulsed light. Based on the vertical angle data, the horizontal angle data, and the distance measurement data, three-dimensional coordinates of the measuring point can be acquired.

Then, 360° full panoramic point cloud data for which the machine center M of the surveying device 22 is a reference is acquired, and each point of the point cloud data has three-dimensional coordinates.

Here, the machine center M is offset from the rotation center of the surveying device main body 24 by a distance D in the horizontal direction (offset distance D).

Therefore, by correcting the measured horizontal distance of each point of the point cloud data based on the distance D, the point cloud data can be converted into point cloud data for which the center line V is a reference, that is, point cloud data for which the camera origin O is a reference.

Note that the horizontal distance may be corrected by the distance D in real time for each point when acquiring each point of the point cloud, or may be collectively corrected after completion of the acquisition of the point cloud data.

Further, based on the known height from the reference point to the machine center M, point cloud data for which the reference point is a reference is calculated. The storage unit 36 stores the acquired point cloud data.

When the surveying device 22 acquires the point cloud data, the arithmetic control unit 35 causes the imaging unit 2 to capture a wide-angle image. In the present embodiment, the imaging unit 2 includes the first and second cameras 2*a* and 2*b*. Thus, the first and second cameras 2*a* and 2*b* acquire a first wide-angle image and a second wide-angle image, respectively. The camera storage unit 13 stores each of the acquired wide-angle images, and the first and second wide-angle images are combined as a wide-angle image of the imaging unit 2.

As described above, the horizontal angle of view of each of the first and second cameras 2*a* and 2*b* is from 50° to 150°. For example, when it is assumed that the horizontal angle of view is 90°, if the surveying device main body 24 is horizontally rotated in angular steps of 72° and a wide-angle image is acquired in each step, a full panoramic image can be acquired with the overlapping angle of view of 18°. The storage unit 36 stores each of the acquired wide-angle images.

The arithmetic control unit 35 combines the respective wide-angle images based on overlapped portions thereof, to create a 360° full panoramic image. Note that the imaging control unit 12 may create the 360° full panoramic image.

The arithmetic control unit 35 combines the respective wide-angle images, and combines the full panoramic image and the point cloud data.

When combining the full panoramic image and the point cloud data, since the point cloud data is converted into the point cloud data for which the camera origin O is the reference, no positional deviation occurs with regard to the correspondence between each pixel of the image and each corresponding point of the point cloud data. As a result, the point cloud data can be accurately colored based on the full panoramic image, and the three-dimensional coordinates can be accurately assigned to each pixel of the full panoramic image based on the point cloud data.

As described above, the three-dimensional coordinates of each point of the point cloud data are converted into the three-dimensional coordinates for which the camera origin O is the reference, it is possible to reduce or substantially eliminate parallax between the surveying device main body 24 and the camera, that is, parallax between the point cloud data and the full panoramic image.

Therefore, it is possible to improve the coloring accuracy of the point cloud or the assigning accuracy of the three-dimensional coordinates to each pixel of the full panoramic image, and when measuring a specific measuring point, to perform highly accurate collimation by using the full panoramic image as a collimation image.

Figure 9:
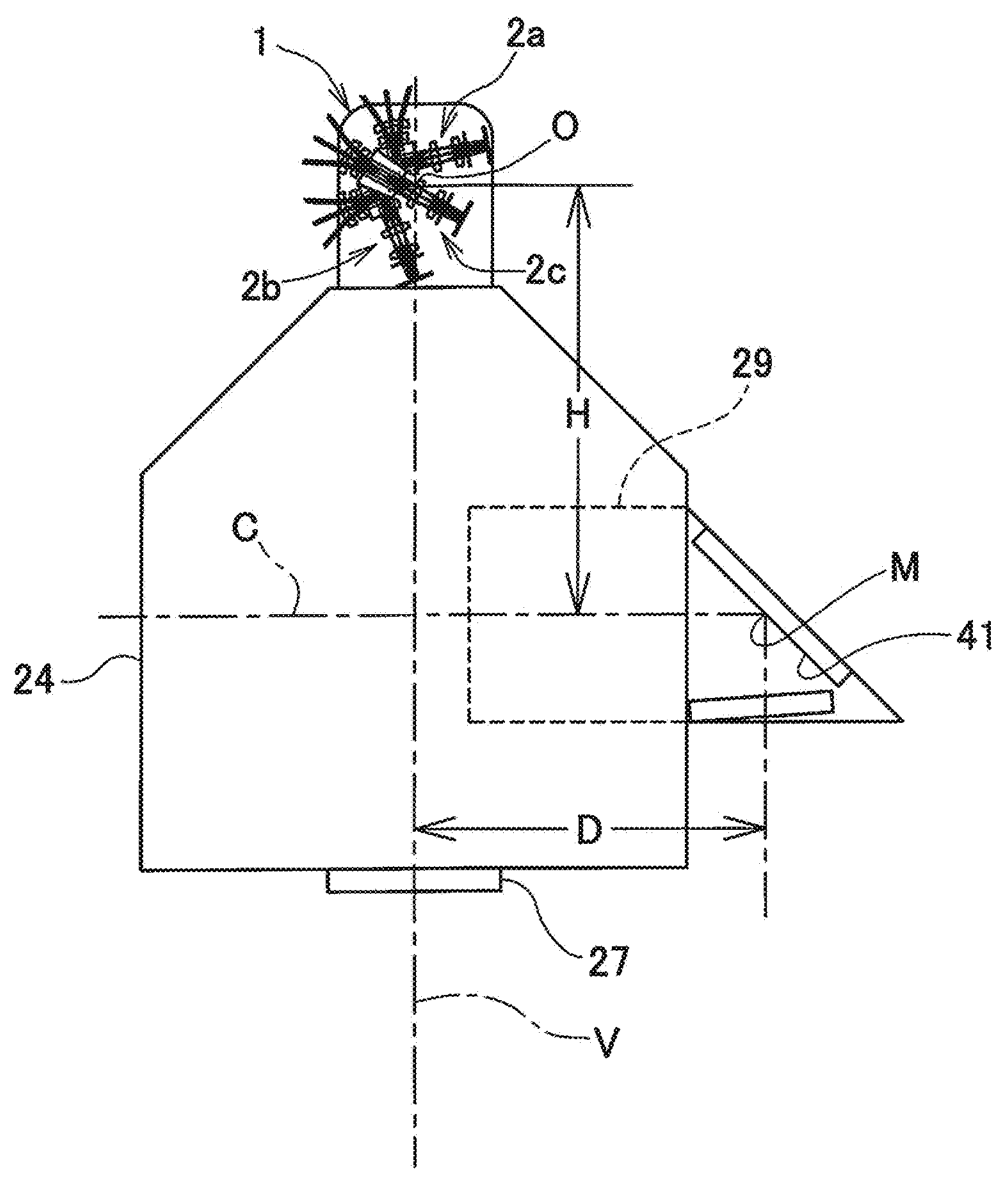
FIG. 9 is an explanatory diagram illustrating main portions of the survey system according to the fourth embodiment.

FIG. 9 illustrates a survey system according to a fifth embodiment.

Note that the same reference signs are appended in FIG. 9 to equivalent parts to those of FIG. 7, and description thereof is omitted. In FIG. 9, the tripod 23, the leveling unit 25, and the horizontal rotation drive unit 26 are not illustrated.

In the fifth embodiment, the camera origin O of the wide-angle camera device 1 and the machine center M of the surveying device main body 24 (lens barrel 29) are offset from each other in the horizontal direction and the vertical direction. Here, the offset distance in the horizontal direction is denoted by D, and the offset distance in the vertical direction is denoted by H.

The surveying device main body 24 is provided so as to be horizontally rotatable around the center line V via the rotation shaft 27. The lens barrel 29 is provided at the surveying device main body 24 so as to be rotatable in the vertical direction around the center line C. The lens barrel 29 includes a scanning mirror 41 and emits the distance measuring light onto the distance measuring optical axis via the scanning mirror 41 via the scanning mirror 41. The distance measuring optical axis is rotated in a vertical plane by the rotation of the lens barrel 29.

The machine center M (measurement reference point) of the lens barrel 29 is an intersection point between the center line C and a reflection surface of the scanning mirror 41.

The wide-angle camera device 1 is integrally provided on the upper surface of the surveying device main body 24. The center line V is set so as to pass through the camera origin O of the wide-angle camera device 1. Note that the shape of the upper portion of the surveying device main body 24 is a truncated cone shape so as not to block the imaging range of the wide-angle camera device 1.

In the fifth embodiment, the wide-angle camera device 1 illustrated in the second embodiment is used that includes the three cameras, namely, the first to third cameras 2*a* to 2*c*.

Note that description of the wide-angle camera device 1 of the second embodiment is omitted.

In the fifth embodiment, pulses of the distance measuring light are emitted via the scanning mirror 41, the surveying device main body 24 is horizontally rotated at a constant speed, and the lens barrel 29 is vertically rotated at a constant speed. As a result, two-dimensional scanning is performed by the distance measuring light. The distance is measured for each pulse of light, and point cloud data is acquired in which each measuring point has three-dimensional coordinates (three-dimensional data).

The machine center M serves as the reference for the three-dimensional coordinates of the point cloud data, and the three-dimensional coordinates are offset from the camera origin O of the wide-angle camera device 1 by the horizontal distance D and the vertical distance H.

Therefore, the horizontal distance and the vertical distance of each point of the point cloud data are corrected based on the horizontal distance D and the vertical distance H, and the point cloud data is converted into point cloud data for which the camera origin O is the reference.

By combining the converted point cloud data with the full panoramic image acquired by the wide-angle camera device 1, the parallax between the surveying device main body 24 and the camera can be reduced or substantially eliminated.

Therefore, in the fifth embodiment, it is also possible to improve the coloring accuracy of the point cloud or the assigning accuracy of the three-dimensional coordinates to each pixel of the full panoramic image, and when measuring a specific measuring point, to perform highly accurate collimation using the full panoramic image as the collimation image.

Although the wide-angle camera device according to the second embodiment has been described as the wide-angle camera device according to the fifth embodiment, it is needless to say that the wide-angle camera device illustrated in the first embodiment, the modified example of the first embodiment, the modified example of the second embodiment, or the third embodiment may also be used as the wide-angle camera device according to the fifth embodiment.

REFERENCE SIGNS LIST

1 Wide-angle camera device
2*a* First camera
2*b* Second camera
2*c* Third camera
6*a* Prism
6*b* Prism
6*c* Prism
10*a* Imaging lens rear group
10*b* Imaging lens rear group
10*c* Imaging lens rear group
11*a* Imaging lens front group
11*b* Imaging lens front group
11*c* Imaging lens front group
12 Imaging control unit
21 Survey system
22 Surveying device
29 Lens barrel
34 Distance measuring unit
35 Arithmetic control unit
36 Storage unit

The invention claimed is:

1. A wide-angle camera device comprising:
a plurality of cameras each including:
an imaging lens rear group as an objective lens;
an imaging lens front group as an imaging forming lens;
a prism configured to optically couple the imaging lens rear group and the imaging lens front group; and
an image sensor configured to optically receive an image formed by the imaging lens rear group, wherein
the prisms are bonded or brought into close contact with each other to integrate the plurality of cameras,
angles of view of adjacent ones of the cameras partially overlap each other,
an entrance pupil position of each of the cameras is formed between the imaging lens front group and the prism, and
an intersection point of optical axes is a camera origin.

2. The wide-angle camera device according to claim 1, wherein
the wide-angle camera device includes two cameras,
the prisms have a reflection surface,
the optical axes of the cameras are deflected by the reflection surface,
the imaging lens rear group is provided on one of the deflected optical axes,
the imaging lens front group is provided on the other of the deflected optical axes, and
the prisms of the two cameras are integrated by the reflection surfaces being bonded or brought into close contact with each other.

3. A survey system comprising:
the wide-angle camera device according to claim 2; and
a surveying device provided on a tripod, wherein
the wide-angle camera device is integrally provided in the surveying device,
the surveying device has a machine center,
the wide-angle camera device has a camera origin,
the surveying device is rotatable around a center line passing through the camera origin, and
an offset distance between the machine center and the camera origin is known.

4. The wide-angle camera device according to claim 1, wherein
the wide-angle camera device includes three cameras arranged in the same plane,
a center prism of the camera arranged at a center has a three-dimensional shape formed by six surfaces,
the optical axis of the camera at the center passes straight through the prism,
the prisms of the other two cameras have reflection surfaces configured to deflect the optical axes of the cameras, respectively, and
the three cameras are integrated by the reflection surfaces of the prisms of the other two cameras being bonded or brought into close contact with two opposing surfaces of the center prism, respectively.

5. A survey system comprising:
the wide-angle camera device according to claim 3; and
a surveying device provided on a tripod, wherein
the wide-angle camera device is integrally provided in the surveying device,
the surveying device has a machine center,
the wide-angle camera device has a camera origin,
the surveying device is rotatable around a center line passing through the camera origin, and
an offset distance between the machine center and the camera origin is known.

6. The wide-angle camera device according to claim 1, wherein
the wide-angle camera device includes a plurality of the cameras arranged radially at a predetermined angular interval in the same plane, a planar shape of the prism of each of the cameras is a trapezoidal shape, and the plurality of cameras are integrated by the prisms adjacent to each other being sequentially bonded or brought into close contact with each other.

7. The wide-angle camera device according to claim 6, wherein the prism has a reflection surface, and the reflection surface deflects the optical axis of the camera in a direction perpendicular to the same plane.

8. A survey system comprising:

the wide-angle camera device according to claim 4; and a surveying device provided on a tripod, wherein the wide-angle camera device is integrally provided in the surveying device, the surveying device has a machine center, the wide-angle camera device has a camera origin, the surveying device is rotatable around a center line passing through the camera origin, and an offset distance between the machine center and the camera origin is known.

9. The wide-angle camera device according to claim 7, wherein deflection directions, by the reflection surfaces, of the optical axes of the cameras adjacent to each other are opposite to each other.

10. A survey system comprising:

the wide-angle camera device according to claim 5; and a surveying device provided on a tripod, wherein the wide-angle camera device is integrally provided in the surveying device, the surveying device has a machine center, the wide-angle camera device has a camera origin, the surveying device is rotatable around a center line passing through the camera origin, and an offset distance between the machine center and the camera origin is known.

11. A survey system comprising:

the wide-angle camera device according to claim 6; and a surveying device provided on a tripod, wherein the wide-angle camera device is integrally provided in the surveying device, the surveying device has a machine center, the wide-angle camera device has a camera origin, the surveying device is rotatable around a center line passing through the camera origin, and an offset distance between the machine center and the camera origin is known.

12. A survey system comprising:

the wide-angle camera device according to claim 1; and a surveying device provided on a tripod, wherein the wide-angle camera device is integrally provided in the surveying device, the surveying device has a machine center, the wide-angle camera device has a camera origin, the surveying device is rotatable around a center line passing through the camera origin, and an offset distance between the machine center and the camera origin is known.

13. The survey system according to claim 12, wherein the surveying device includes:

a distance measuring unit configured to emit distance measuring light and receive reflected distance measuring light reflected from an object to be measured;

a rotation unit configured to cause the distance measuring light to be emitted;

a vertical rotation drive unit configured to rotate the rotation unit in a vertical direction;

a surveying device main body including the rotation unit;

a horizontal rotation drive unit configured to rotate the surveying device main body in a horizontal direction;

an angle measuring unit configured to detect an emission direction of the distance measuring light; and an arithmetic control unit configured to control driving of the vertical rotation drive unit and the horizontal rotation drive unit, and to calculate three-dimensional point cloud data based on a light reception result of the reflected distance measuring light and a detection result of the angle measuring unit, and based on the offset distance, the arithmetic control unit converts the point cloud data into point cloud data having the camera origin as a reference, and combines the converted point cloud data with a wide-angle image acquired by the wide-angle camera device.

14. The survey system according to claim 12, wherein the wide-angle camera device is provided at a side surface of the surveying device.

15. The survey system according to claim 12, wherein the wide-angle camera device is provided at an upper surface of the surveying device.

* * * * *